Patented Mar. 13, 1934

1,950,478

UNITED STATES PATENT OFFICE 1,950,478

METHOD OF COMPOUNDING RUBBER

William S. Calcott and William A. Douglass, Penns Grove, N. J., assignors to E. I. du Pont de Nemours & Company, Wilmington, Del., a corporation of Delaware No Drawing. Application August 22, 1929, Serial No. 387,790

38 Claims. (Cl. 18—50)

This invention relates to a method of treating rubber and the resulting rubber product and is more particularly concerned with a method of treatment whereby a rubber product is obtained which is unusually resistant to deterioration due to both oxidation and high temperatures.

It is generally accepted that the rate of deterioration of rubber articles differs greatly depending on various factors, such as the composition of the stock, the form of the article and the conditions under which it is used.

Various types of compounds have been proposed for use in retarding the deterioration of rubber. For example, the secondary diaromatic amines such as phenyl alpha naphthylamine have been found to greatly retard the type of deterioration which takes place in the oxygen bomb, especially when the extent of the deterioration is judged by the appearance of the rubber samples. Aromatic diamino compounds, of which meta-toluylene-diamine is an example, have been successfully used to retard the type of deterioration which occurs in the Geer oven, particularly at high temperatures, (90° C.) and is evidenced by a decrease in the tensile strength of the rubber. These compounds are also particularly effective in retarding the rate of decrease in tensile strength when the rubber is subjected to accelerated aging in the oxygen bomb at 70° C. under 300 lbs. oxygen pressure.

The use of mixtures, each component of which contributes its effect in retarding the type of deterioration for which it is best adapted, has been proposed in our copending application Serial No. 234,459, filed November 19, 1927.

The primary object of this invention is to provide a method for retarding the deterioration of rubber by the use of a single compound which is adapted to protect the rubber against the effects of heat as well as oxygen.

With these objects in view, we have now discovered a class of compounds which, because of the nature of the substituent groups, combine these dual functions in one molecule. These compounds may be represented by the following general formula:

$$NH_2-R-N-R'-Y$$
$$|$$
$$H$$

wherein R and R' represent the same or different aryl radicals and Y represents H, OH, or $NH_2$. The aryl radicals may contain alkyl or alkoxy substituents.

In order to disclose the invention in detail, the following examples of actual embodiments thereof are presented. It should be understood however that these examples are furnished purely for purposes of illustration and that it is not the intention that the invention be limited to the particular reagents, proportions or other conditions therein specified.

Example 1

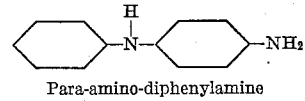

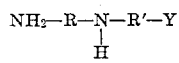
Para-amino-diphenylamine may be cited as an example in which R and R' are the same aromatic nucleus (phenyl) and only one hydrogen of the aromatic nuclei is replaced by an amino group.

In order to test the effectiveness of this compound, three stocks were made up of the following composition of weight:

|  | Stock A | Stock B | Stock C |
|---|---|---|---|
| Smoked sheets | 100 | 100 | 100 |
| Zinc oxide | 18.15 | 18.15 | 18.15 |
| Sulfur | 2.75 | 2.75 | 2.75 |
| Di-o-tolylguanidine | 0.5625 | 0.5625 | 0.5625 |
| p-amino-diphenylamine | 0.0 | 1.0 | 0.0 |
| Phenyl-alpha-naphthylamine | 0.0 | 0.0 | 1.0 |

These stocks were cured for 30 minutes at 40 lbs. steam pressure and thereupon subjected to an accelerated aging test in the oxygen bomb at 70° C. under 300 lbs. oxygen pressure. Stock A was completely deteriorated in 4 days. Stocks B and C had retained their elasticity even after 20 days, when the test was discontinued. Accelerated aging tests carried out in the oxygen bomb and Geer oven showed that Stock B retained its original tensile strength for a longer time than did either Stocks A or C.

In addition to p-amino-diphenylamine, the ortho and meta-amino-diphenylamines may be employed and have similar anti-aging properties The phenyl groups may contain alkyl or alkoxy substituents.

Among other members of the group of antioxidants in which R and R' are phenyl groups and Y is H or OH, the following compounds have antioxidant properties comparable to those of p-amino-diphenylamine:

1. 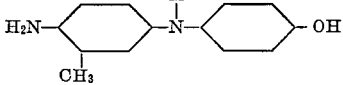

4-amino-3-methyl-4'-hydroxy-diphenylamine

2. 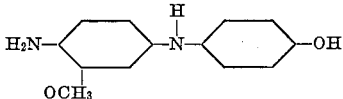

4-amino-3-methoxy-4'-hydroxy-diphenylamine

3. 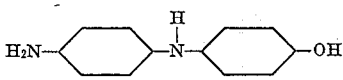

p-amino-p'-hydroxy-diphenylamine

4. 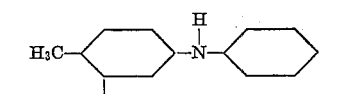

3-amino-4-methyl-diphenylamine

Example 2

Similar compounds in which one or both of R and R' represent naphthyl nuclei have been tested and found to have comparable properties, as for example:

5. 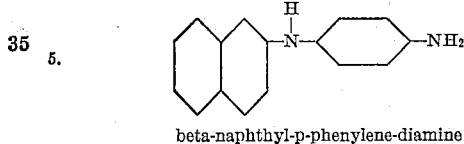

beta-naphthyl-p-phenylene-diamine

In order to test the effectiveness of this compound two stocks were made up of the following composition by weight:

|  | Stock A | Stock B |
| --- | --- | --- |
| Smoked sheets | 100 | 100 |
| Zinc oxide | 18.15 | 18.15 |
| Di-o-tolyl-guanidine | 0.5625 | 0.5625 |
| Sulfur | 2.75 | 2.75 |
| Beta-napthyl-p-phenylene-diamine | 0.0 | 1.0 |

These stocks were cured for 40 minutes at 40 lbs. steam pressure and thereupon aged in an oxygen bomb at 70° C. under 300 lbs. of oxygen pressure. Stock A was completely deteriorated in 4 days and Stock B in 20 days.

Among other compounds of this general type and having comparable antioxidant properties may be mentioned the following:

6. 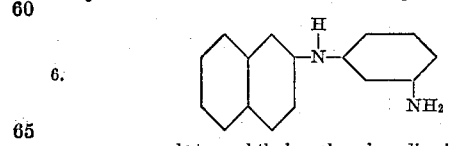

beta-naphthyl-m-phenylene-diamine

7. 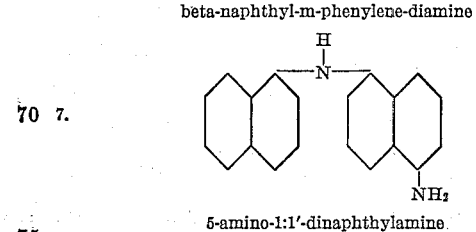

5-amino-1:1'-dinaphthylamine

8. 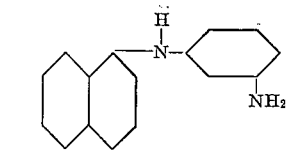

alpha-naphthyl-m-phenylene-diamine

9. 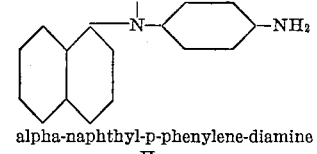

alpha-naphthyl-p-phenylene-diamine

10. 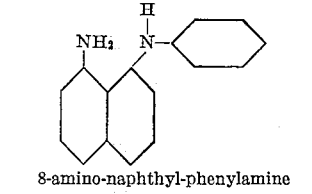

8-amino-naphthyl-phenylamine

Example 3

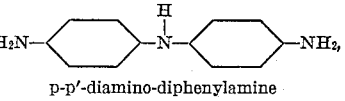

p-p'-diamino-diphenylamine may be cited as an example of compounds of the type covered by the general formula in which Y is represented by an amino group and R and R' both represent phenyl nuclei.

In order to test the effectiveness of this compound two stocks were made of the following composition by weight:

|  | Stock A | Stock B |
| --- | --- | --- |
| Smoked sheet | 100 | 100 |
| Zinc oxide | 18.15 | 18.15 |
| Di-o-tolyl-guanidine | 0.5625 | 0.5625 |
| Sulfur | 2.75 | 2.75 |
| p:p'-diamino-diphenylamine | 0.0 | 1.0 |

These stocks were cured for 40 minutes at 40 lbs. steam pressure and thereupon aged in an oxygen bomb at 70° C. under 300 lbs. oxygen pressure. Stock A was completely deteriorated in 4 days and Stock B in 17 days.

In addition to p-p'-diamino-diphenylamine the homologues thereof and compounds containing alkyl or alkoxy substituents in the aryl nuclei may be employed. Also, as indicated in connection with the mono-amino compounds, the corresponding diamino-phenyl-naphthylamines and diamino-dinaphthylamines, having not more than one amino group in either aryl nucleus, may be employed. As typical examples of such compounds, the following are listed:

1. 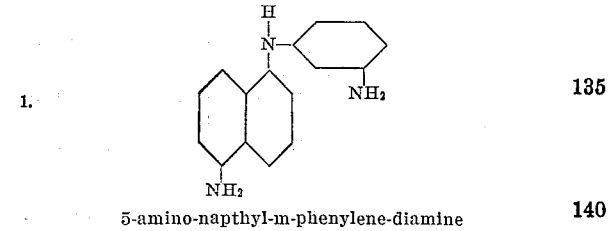

5-amino-napthyl-m-phenylene-diamine

2. 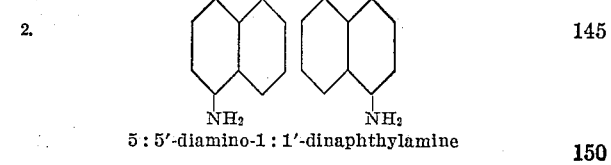

5:5'-diamino-1:1'-dinaphthylamine

It will be understood from the above description that the present invention embraces a large number of compounds and that many other compounds adapted for use as antioxidants could be named. The compounds mentioned hereinabove have been listed merely by way of example. It will be obvious from the above disclosure that both the mono- and di-amino compounds of the type indicated by the general formula and having not more than one amino group in either aryl nucleus are within the scope of the present invention. It will also be clear that the corresponding amino-hydroxy-diarylamines which do not contain two amino groups in the same aryl nucleus or one amino group together with a hydroxy group in the same aryl nucleus are also effective.

Either R or R' or both may also be a diphenyl nucleus thus giving compounds such as the following amino-diphenyl-arylamines:

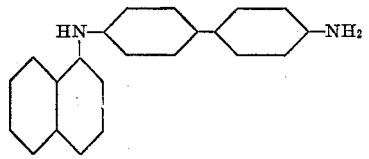

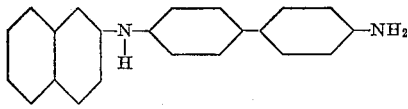

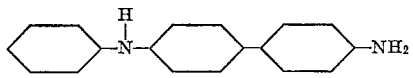

These and similar compounds are effective antioxidants for rubber. Compounds such as those indicated by the above formulas, for example, the aminodiphenyl-naphthylamines can be made by the condensation of 1 mol of benzidine with 1 mol of alpha or beta-naphthol. In such compounds the diphenyl nucleus may also contain alkyl or alkoxyl substituents. Examples of these latter are the compounds

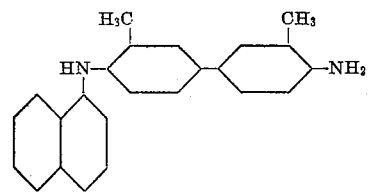

which may be made by the condensation of 1 mol of tolidine with 1 mol of alpha-naphthol, and

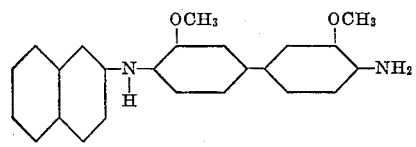

made by the condensation of equimolecular amounts of dianisidine and beta-naphthol. The corresponding diamino and amino hydroxy compounds likewise are effective and may be prepared by a similar condensation of the appropriate intermediates.

Moreover, as indicated by the compounds tested, it has been discovered that compounds of the type described hereinabove may contain alkyl or alkoxy substituents in the phenyl or naphthyl nuclei without materially affecting the anti-aging properties. Of all these compounds, however, by reason of their particularly valuable properties as antioxidants, the mono-amino-diarylamines represent our preferred class and especially p-amino-diphenylamine.

The antioxidants may be incorporated into the rubber by any well known means, such as milling them into the stock upon the rolls of an ordinary mill. Moreover, they may be employed in various rubber compounds and rubber substitutes such as, for example, gutta-percha, balata and synthetic rubber, and it is therefore to be understood that the invention is not limited to any particular rubber stock or rubber compound. Also, the proportions of the antioxidant employed may be varied within wide limits although under ordinary circumstances about 1% of the antioxidant based on the weight of the stock treated has been found to be highly satisfactory.

While we prefer to use antioxidants of this type by adding the antioxidant to the rubber mix prior to vulcanization, it is also possible to use them for treatment of vulcanized rubber. In such cases the rubber may be impregnated by either dissolving the antioxidant in a solvent or by employing it in vapor form.

As many apparent and widely different embodiments of this invention may be made without departing from the spirit thereof, it is to be understood that we do not limit ourselves to the foregoing examples or description except as indicated in the following claims:

We claim:

1. The process of increasing the resistance of vulcanized rubber to deterioration which comprises incorporating in the rubber a compound having the general formula:

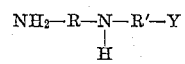

wherein R represents an aryl radical, R' represents a phenyl radical and Y represents H or OH and wherein N is directly connected to a carbon atom in the ring of the aryl and phenyl radicals.

2. The process of increasing the resistance of vulcanized rubber to deterioration which comprises incorporating in the rubber a compound having the general formula:

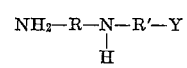

wherein R represents an aryl radical, R' represents a phenyl radical and Y represents H and wherein N is directly connected to a carbon atom in the ring of the aryl and phenyl radicals.

3. The process of increasing the resistance of vulcanized rubber to deterioration which comprises incorporating in the rubber a compound having the general formula:

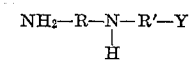

wherein R represents a phenyl radical, R' represents a phenyl radical and Y represents H or OH and wherein N is directly connected to a carbon atom in the ring of the phenyl radicals.

4. The process of increasing the resistance of vulcanized rubber to deterioration which comprises incorporating in the rubber a compound having the general formula:

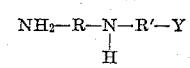

wherein R represents a phenyl radical, R' represents a phenyl radical and Y represents H and wherein N is directly connected to a carbon atom in the ring of the phenyl radicals.

5. The process of increasing the resistance of rubber to deterioration which comprises incorporating with the rubber an amino-naphthyl-phenylamine.

6. The process of increasing the resistance of rubber to deterioration which comprises incorporating with the rubber an 8-amino-naphthyl-phenylamine.

7. The process of increasing the resistance of vulcanized rubber to deterioration which comprises incorporating in the rubber a compound having the general formula:

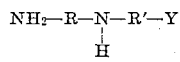

wherein R represents a naphthyl or diphenyl radical, R' represents an aryl radical and Y represents H, OH or NH₂.

8. The process of increasing the resistance of vulcanized rubber to deterioration which comprises incorporating in the rubber a compound having the general formula:

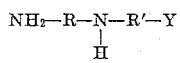

wherein R represents a naphthyl or diphenyl radical, R' represents a phenyl or naphthyl radical and Y represents H, OH or NH₂.

9. In the art of vulcanizing rubber, the step of mixing with the unvulcanized rubber a vulcanizing agent and a compound having the general formula:

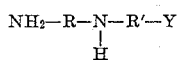

wherein R represents an aryl radical, R' represents a phenyl radical and Y represents H or OH and wherein N is directly connected to a carbon atom in the ring of the aryl and phenyl radicals.

10. In the art of vulcanizing rubber, the step of mixing with the unvulcanized rubber a vulcanizing agent and a compound having the general formula:

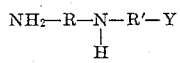

wherein R represents an aryl radical, R' represents a phenyl radical and Y represents H and wherein N is directly connected to a carbon atom in the ring of the aryl and phenyl radicals.

11. In the art of vulcanizing rubber, the step of mixing with the unvulcanized rubber a vulcanizing agent and a compound having the general formula:

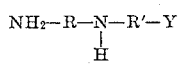

wherein R represents a phenyl radical, R' represents a phenyl radical and Y represents H or OH and wherein N is directly connected to a carbon atom in the ring of the phenyl radicals.

12. In the art of vulcanizing rubber, the step of mixing with the unvulcanized rubber a vulcanizing agent and a compound having the formula:

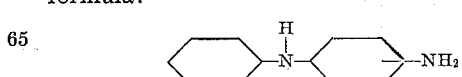

13. In the art of vulcanizing rubber, the step of mixing with the unvulcanized rubber a vulcanizing agent and a compound having the general formula:

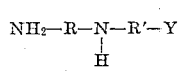

wherein R represents a naphthyl or diphenyl radical, R' represents an aryl radical and Y represents H, OH or NH₂.

14. In the art of vulcanizing rubber, the step of mixing with the unvulcanized rubber a vulcanizing agent and a compound having the general formula:

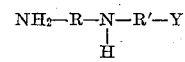

wherein R represents a naphthyl or diphenyl radical, R' represents a phenyl or naphthyl radical and Y represents H, OH or NH₂.

15. Rubber having incorporated therein an anti-aging compound having the general formula:

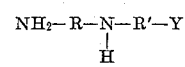

wherein R represents an aryl radical, R' represents a phenyl radical and Y represents H or OH and wherein N is directly connected to a carbon atom in the ring of the aryl and phenyl radicals.

16. Rubber having incorporated therein an anti-aging compound having the general formula:

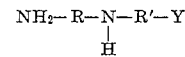

wherein R represents an aryl radical, R' represents a phenyl radical and Y represents H and wherein N is directly connected to a carbon atom in the ring of the aryl and phenyl radicals.

17. Rubber having incorporated therewith an anti-aging compound having the general formula:

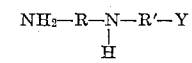

wherein R and R' both represent phenyl groups, and Y represents H or OH and wherein N is directly connected to a carbon atom in the ring of the aryl radicals.

18. Rubber having incorporated therewith an anti-aging compound having the general formula:

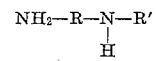

wherein R and R' both represent phenyl groups.

19. Rubber having incorporated therein an anti-aging compound having the general formula:

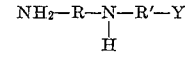

wherein R represents a naphthyl or diphenyl radical, R' represents an aryl radical and Y represents H, OH or NH₂.

20. Rubber having incorporated therein an anti-aging compound having the general formula:

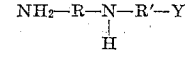

wherein R represents a naphthyl or diphenyl radical, R' represents a phenyl or naphthyl radical and Y represents H, OH or NH₂.

21. Vulcanized rubber obtained by incorporating therewith prior to vulcanization, a vulcanizing agent and an anti-aging compound having the formula:

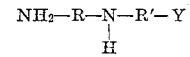

wherein R represents an aryl radical, R' represents a phenyl radical and Y represents H or OH and wherein N is directly connected to a carbon atom in the ring of the aryl and phenyl radicals.

22. Vulcanized rubber obtained by incorporating therewith prior to vulcanization, a vulcanizing agent and an anti-aging compound having the formula:

$$NH_2-R-N(H)-R'-Y$$

wherein R represents an aryl radical, R' represents a phenyl radical and Y represents H and wherein N is directly connected to a carbon atom in the ring of the aryl and phenyl radicals.

23. Vulcanized rubber obtained by incorporating therewith prior to vulcanization, a vulcanizing agent and an anti-aging compound having the formula:

$$NH_2-R-N(H)-R'-Y$$

wherein R represents a phenyl radical, R' represents a phenyl radical and Y represents H or OH and wherein N is directly connected to a carbon atom in the ring of the phenyl radicals.

24. Vulcanized rubber obtained by incorporating with the rubber prior to vulcanization, a vulcanizing agent and anti-aging compound having the formula:

$$NH_2-R-N(H)-R'$$

wherein R and R' represent phenyl radicals.

25. Vulcanized rubber obtained by incorporating therewith prior to vulcanization, a vulcanizing agent and an amino-naphthyl-phenylamine.

26. Vulcanized rubber obtained by incorporating therewith prior to vulcanization, a vulcanizing agent and an 8-aminonaphthyl-phenylamine.

27. Vulcanized rubber obtained by incorporating therewith prior to vulcanization, a vulcanizing agent and $$\text{C}_6\text{H}_5-\text{NH}-\text{C}_6\text{H}_4-\text{NH}_2$$

28. Vulcanized rubber obtained by incorporating therewith prior to vulcanization, a vulcanizing agent and an anti-aging compound having the formula:

$$NH_2-R-N(H)-R'-Y$$

wherein R represents a naphthyl or diphenyl radical, R' represents an aryl radical and Y represents H, OH or $NH_2$.

29. Vulcanized rubber obtained by incorporating therewith prior to vulcanization, a vulcanizing agent and an anti-aging compound having the formula:

$$NH_2-R-N(H)-R'-Y$$

wherein R represents a naphthyl or disphenyl radical, R' represents a phenyl or naphthyl radical and Y represents H, OH or $NH_2$.

30. The process of increasing the resistance of rubber to deterioration which comprises incorporating in the rubber p-amino-di-phenylamine.

31. The process of increasing the resistance of rubber to deterioration which comprises incorporating in the rubber p-amino-p'-hydroxy-diphenylamine.

32. The process of increasing the resistance of rubber to deterioration which comprises incorporating in the rubber 1-phenylamino-8-aminonaphthalene.

33. In the art of vulcanizing rubber, the step of mixing with the unvulcanized rubber a vulcanizing agent and p-amino-diphenylamine.

34. In the art of vulcanizing rubber, the step of mixing with the unvulcanized rubber a vulcanizing agent and p-amino-p'-hydroxy-diphenylamine.

35. In the art of vulcanizing rubber, the step of mixing with the unvulcanized rubber a vulcanizing agent and 1-phenyl-amino-8-aminonaphthalene.

36. Rubber having incorporated therein as an anti-aging compound p-amino-diphenylamine.

37. Rubber having incorporated therein as an anti-aging compound p-amino-p'-hydroxy-diphenylamine.

38. Rubber having incorporated therein as an anti-aging compound 1-phenylamino-8-aminonaphthalene.

WILLIAM S. CALCOTT.
WILLIAM A. DOUGLASS.